US010719823B2

(12) United States Patent
Granbery

(10) Patent No.: US 10,719,823 B2
(45) Date of Patent: *Jul. 21, 2020

(54) SYSTEMS AND METHODS FOR WIRELESSLY DETERMINING ACCEPTED FORMS OF PAYMENT

(71) Applicant: PayPal, Inc., San Jose, CA (US)

(72) Inventor: John Hastings Granbery, Los Altos, CA (US)

(73) Assignee: PAYPAL, INC., San Jose, CA (US)

( * ) Notice: Subject to any disclaimer, the term of this patent is extended or adjusted under 35 U.S.C. 154(b) by 575 days.

This patent is subject to a terminal disclaimer.

(21) Appl. No.: 15/634,649

(22) Filed: Jun. 27, 2017

(65) Prior Publication Data

US 2018/0012219 A1    Jan. 11, 2018

Related U.S. Application Data

(63) Continuation of application No. 14/248,259, filed on Apr. 8, 2014, now Pat. No. 9,691,062.

(51) Int. Cl.
*G06Q 40/00* (2012.01)
*G06Q 20/32* (2012.01)
*G06Q 20/34* (2012.01)
*G06Q 20/22* (2012.01)
*G06Q 20/36* (2012.01)

(52) U.S. Cl.
CPC ....... *G06Q 20/3278* (2013.01); *G06Q 20/227* (2013.01); *G06Q 20/3224* (2013.01); *G06Q 20/34* (2013.01); *G06Q 20/3672* (2013.01)

(58) Field of Classification Search
CPC combination set(s) only.
See application file for complete search history.

(56) References Cited

U.S. PATENT DOCUMENTS

| 8,473,748 B2 * | 6/2013 | Sampas | G06Q 20/3224 713/186 |
| 2009/0048971 A1 * | 2/2009 | Hathaway | G06Q 20/105 705/41 |
| 2014/0006272 A1 * | 1/2014 | Calman | G06Q 30/06 705/40 |

OTHER PUBLICATIONS

U Mallat, N., & Tuunainen, V. K. (2008). Exploring merchant adoption of mobile payment systems: an empirical Studyl. E—Service Journal, 6(2), 24-57. Retrieved from http://search.proquest.eom/docview/194892719?accountid=14753.*
Polasik, M., PhD., Gorka, J., PhD, Wilczewski, G., M.Sc, Kunkowski, J., M.Sc, & Przenajkowska, K., M.Sc. (2010). Time V efficiency of point-of-sale payment methods: Preliminary results. Journal of Internet Banking and Commerce, 15(3), 1-11. Retrieved from http://search.proquest.com/docview/856043399?accountid=1475.*

(Continued)

*Primary Examiner* — Muriel S Tinkler
(74) *Attorney, Agent, or Firm* — Haynes and Boone, LLP

(57) ABSTRACT

Systems and methods are disclosed which may allow a merchant to wirelessly transmit accepted forms of payment using a beacon installed in the merchant location or near the merchant location. A consumer having a device capable of receiving the wireless transmission may receive the accepted forms of payment and have them displayed on a screen of the device. The device may also send the accepted forms of payment to a remote server that has issued the consumer a programmable credit card such that the remote server can program the credit card based on the forms of payment accepted by the merchant.

20 Claims, 7 Drawing Sheets

(56) References Cited

OTHER PUBLICATIONS

Mallat, N. and Tuunainen, V. K. (2008). Exploring Merchant Adoption of Mobile Payment Systems: An Empirical Study1. E—Service Journal, 6(2), 24-57. Retrieved from http://search.proquest.com/docview/194892719accountid=14753. 21 Pages.
Polasik, M. PhD; Gorka, J. PhD; Wilczewski, G. MSc; Kunkowski, J. MSc; and Przenajkowska, K. MSc; (2010). Time Efficiency of Point-of-Sale Payment Methods: Preliminary Results. Journal of Internet Banking and Commerce, 15(3), 1-11. Retrieved from http://search.proquest.com/docview/856043399?accountid=14 753. 8 Pages.
International Search Report Issued by the International Searching Authority for PCT application PCT/US15/20602 dated Jun. 26, 2015. 2 pages.
Written Opinion Issued by the International Searching Authority for PCT application PCT/US15/20602 dated Jun. 26, 2015. 4 pages.

\* cited by examiner

SYSTEMS AND METHODS FOR WIRELESSLY DETERMINING ACCEPTED FORMS OF PAYMENT

CROSS REFERENCED TO RELATED APPLICATIONS

This application is a continuation of U.S. patent application Ser. No. 14/248,259, filed on Apr. 8, 2014 (now U.S. Pat. No. 9,691,062, issued Jun. 27, 2017), the contents of which are incorporated by reference in its entirety.

BACKGROUND

Technical Field

Embodiments disclosed herein are related to systems and methods for determining accepted forms of payment based on a message received when entering or within a reasonable proximity of the merchant.

Related Art

Consumers have many options when paying for items purchased at a merchant. Consumers may have on them at any time multiple forms of payment, such as one or more different credit cards, including credit cards offered by different credit card providers, debit cards, electronic benefit transfer (EBT) cards and other state-funded assistance. Moreover, consumers may be able to pay using near-field communications (NFC) or other wireless technologies. Further, consumers may be able to pay for items using an online payment provider, such as PayPal, Inc. of San Jose, Calif. While many consumers have one or more of these forms of payment options available, most consumers do not have all of these options available. Similarly, merchants typically accept one or more of these forms of payment, but may not accept all of these forms of payment. Consequently, situations may arise when a consumer attempts to purchase an item from the merchant but does not have available any of the forms or payment accepted by the merchant. Merchants may have and, in some areas, be required to posted a banner, marquee, sticker, and the like that displays the forms of payment that are accepted. However these displays may not be easily visible and recognized by the consumer, and may not always be up to date.

Figure 1:
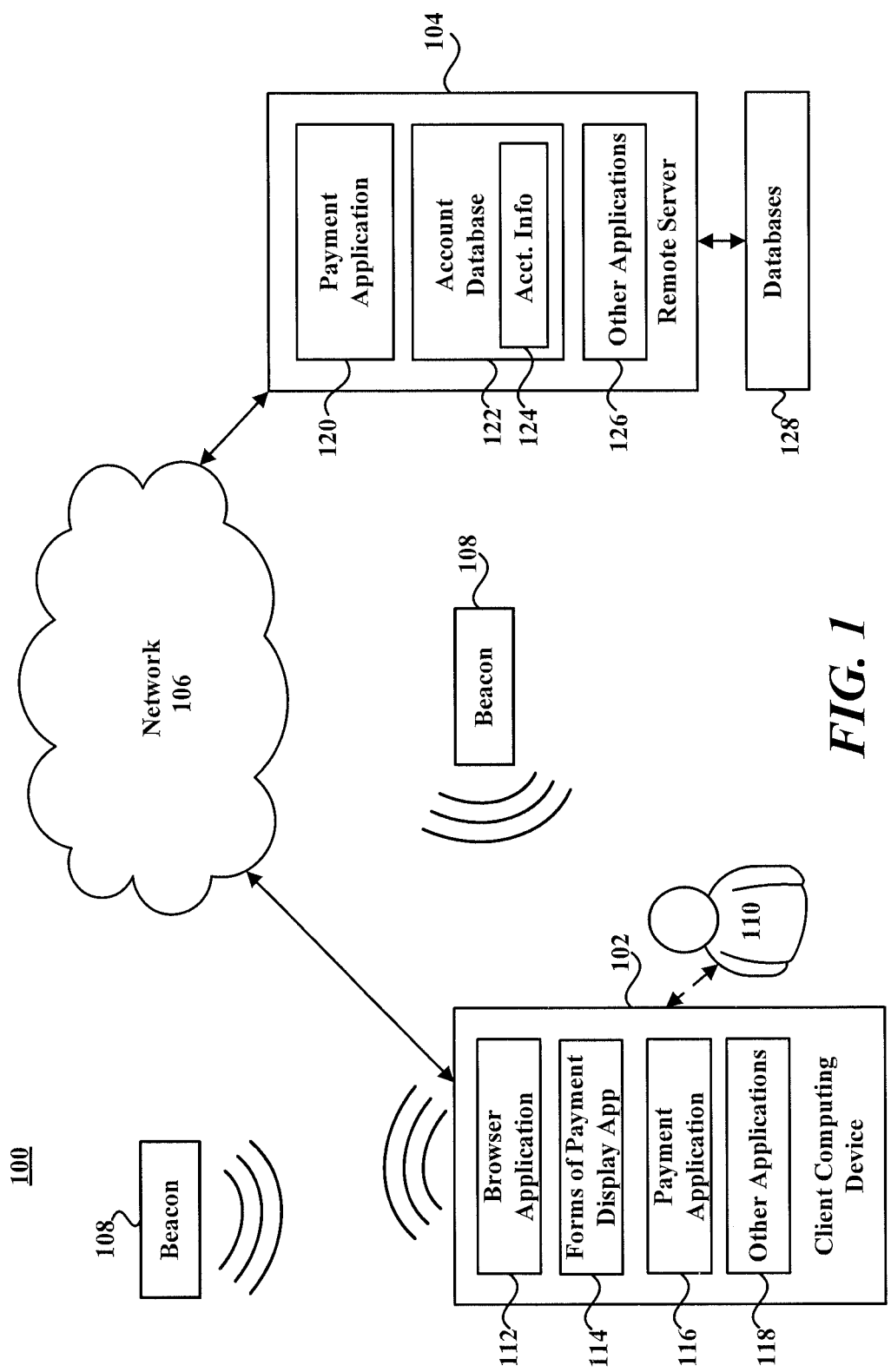
FIG. 1 is a block diagram of a networked system, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

There is a need for determining accepted forms of payment when entering a merchant location or being within a close proximity thereto. Moreover, there is a need for the merchant to be able to provide a notification of the accepted forms of payment that is low cost and reliable.

Consistent with some embodiments, there is provided a system. The system includes one or more wireless transceivers configured to receive wirelessly transmitted information related to forms of payment accepted by a merchant. The system also includes one or more processors configured to process the received information to determine the forms of payment accepted by the merchant. The system further includes a display device configured to display the determined forms of payment accepted by the merchant.

Consistent with some embodiments, there is also provided a method. The method includes steps of wirelessly receiving information related to forms of payment accepted by a merchant, processing the received information to determine the forms of payment accepted by the merchant, and displaying the determined forms of payment accepted by the merchant. The method may be embodied in computer-readable media.

Consistent with some embodiments, there is further provided a method. The method includes steps of receiving forms of payment accepted by a merchant, assigning at least one of the forms of payment accepted by the merchant to a spending card associated with a consumer account, assigning a card number to the spending card corresponding to the assigned form of payment, and sending a notification and assigned card number. The method may also be embodied in computer-readable media.

Embodiments consistent with this disclosure may allow a merchant to use low power transmitting devices to transmit information to a consumer device that enables the consumer device to display accepted forms of payment to the consumer so that the consumer is able to determine the accepted forms of payment as the enter or approach the merchant store. These and other embodiments will be described in further detail below with respect to the following figures.

FIG. 1 is a block diagram of a networked system 100, consistent with some embodiments. System 100 includes a consumer computing device 102 and a remote server 104 in communication over a network 106. Remote server 104 may be a payment service provider server that may be maintained by a payment service provider, such as PayPal, Inc. of San Jose, Calif. Remote server 104 may be maintained by other service providers in different embodiments. Remote server 104 may also be maintained by an entity with which sensitive credentials and information may be exchanged with client computing device 102. Remote server 104 may be more generally a web site, an online content manager, a service provider, such as a bank, or other entity who provides content to a user requiring user authentication or login.

Network 106, in one embodiment, may be implemented as a single network or a combination of multiple networks. For example, in various embodiments, network 106 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Consumer computing device 102, in one embodiment, may be implemented using any appropriate combination of hardware and/or software configured for wired and/or wireless communication over network 106. For example, consumer computing device 102 may be implemented as a wireless telephone (e.g., smart phone), tablet, personal digital assistant (PDA), notebook computer, personal computer, a connected set-top box (STB) such as provided by cable or satellite content providers, or a video game system console, a head-mounted display (HMD) or other wearable computing device, including a wearable computing device having an eyeglass projection screen, and/or various other generally known types of computing devices.

As shown in FIG. 1, system 100 may include one or more beacons 108. In some embodiments, beacons 108 may be installed at a merchant location, such as a store, restaurant, and the like. In some embodiments, beacons 108 may be Bluetooth™ Low Energy (BLE) beacons. BLE is a technology that transmits information at a frequency of about 2.4 GHz (about 2042-2480 MHz) over forty (40) 2-MHz wide channels, and has a range of about 50 meter or about 160 feet. Information transmitted according to the BLE protocol may be transmitted at a rate of about 1 Mbit/s with an application throughput of about 0.27 Mbit/s. In some embodiments, BLE communications may be secured using 128-bit Advanced Encryption Standard (AES) encryption with counter mode with a cipher block chaining message authentication code (CBC-MAC) and user defined security. Further, in some embodiments, BLE communications may utilize adaptive frequency hopping, lazy acknowledgement, a 24-bit cyclic redundancy check (CRC) and 32-bit message integrity check for robustness. Moreover, in some embodiments, BLE-capable devices may consume a fraction of the power of standard Bluetooth® devices due to the protocol allowing low duty cycles, and being designed for applications that may not require continuous data transfer. Beacons 108 may transmit one or more sequences of information such that when a device such as consumer computing device 102 capable of receiving information from beacons 108 comes within the range of a beacon 108, the device may receive a transmission from a beacon 108 and be instructed to perform an action, such as display an advertisement or display accepted forms of payment, or execute a payment application.

Consumer computing device 102 may include any appropriate combination of hardware and/or software having one or more processors and capable of reading instructions stored on a tangible non-transitory machine-readable medium for execution by the one or more processors. Consistent with some embodiments, consumer computing device 102 includes a machine-readable medium, such as a memory (not shown) that includes instructions for execution by one or more processors (not shown) for causing consumer computing device 102 to perform specific tasks. In some embodiments, the instructions may be executed by the one or more processors in response to interaction by consumer 110. For example, such instructions may include browser application 112 such as a mobile browser application, which may be used to provide a user interface to permit consumer 110 to browse information available over network 106, including information hosted by remote server 104. For example, browser application 112 may be implemented as a web browser to view information available over network 106. Browser application 112 may include a graphical user interface (GUI) that is configured to allow consumer 110 to interface and communicate with remote server 104 or other servers managed by content providers or merchants via network 106. For example, consumer 110 may be able to access websites to find and purchase items, as well as access user account information or web content.

Consumer computing device 102 may also include an application that displays accepted forms of payment 114. Forms of payment display application 114 may be configured to receive one or more wireless transmissions from, for example, beacon 108 and display forms of payment accepted by a merchant associated with beacon 108 based on information included in the wireless transmissions.

Consumer computing device 102 may also include a payment application 116 that may be used by consumer 110 using consumer computing device 102 to make a payment. In some embodiments, payment application 116 may be configured to make a payment using remote server 104 as a payment processor. Consumer computing device 102 may include other applications 118 as may be desired in one or more embodiments to provide additional features available to consumer 110, including accessing a user account with remote server 104. For example, applications 118 may include interfaces and communication protocols that allow the user to receive and transmit information through network 106 and to remote server 104 and other online sites. Applications 118 may also include security applications for implementing client-side security features, programmatic client applications for interfacing with appropriate APIs over network 106 or various other types of generally known programs and/or applications. Applications 116 may include mobile applications downloaded and resident on consumer computing device 102 that enables consumer 110 to access content through the applications.

Remote server 104, according to some embodiments, may be maintained by an online payment provider, such as PayPal, Inc. of San Jose, Calif., which may provide processing for online financial and information transactions on behalf of consumer 110. Remote server 104 may include a payment application 120 that may facilitate processing payments for consumer 110 to merchants, for example. In some embodiments, payment application 120 may be configured to interface with payment application 116 to receive payment details, user information, merchant information, and additional information for processing a payment on behalf of consumer 110. Remote server 104 may also include an account database 122 that includes account information 124 for consumers having an account on remote server 104, such as consumer 110. In some embodiments, payment application 120 may process payments based on information in account information 124 of account database 122. Remote server 104 may include other applications 126 and may also be in communication with one or more external databases 128, that may provide additional information that may be used by remote server 104. In some embodiments, databases 128 may be databases maintained by third parties, and may include third party account information of consumer 110.

Although discussion has been made of applications and applications on consumer computing device 102 and remote server 104, the applications may also be, in some embodiments, modules. Module, as used herein, may refer to a software module that performs a function when executed by one or more processors or Application Specific Integrated Circuit (ASIC) or other circuit having memory and at least one processor for executing instructions to perform a function, such as the functions described as being performed by the applications.

Figure 2:
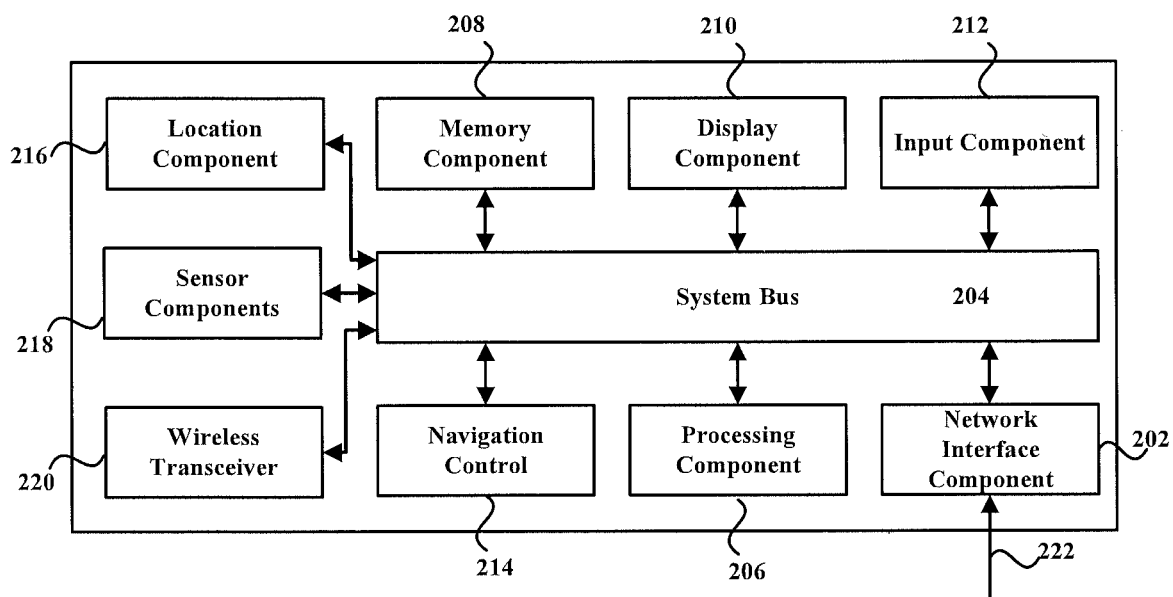
FIG. 2 is a diagram illustrating a computing system, consistent with some embodiments.

FIG. 2 is a diagram illustrating computing system 200, which may correspond to either of consumer computing device 102 or remote server 104, consistent with some embodiments. Computing system 200 may be a mobile device such as a smartphone, a tablet computer, a personal computer, laptop computer, netbook, or tablet computer, set-top box, video game console, head-mounted display (HMD) or other wearable computing device as would be consistent with consumer computing device 102. Further, computing system 200 may also be a server or one server amongst a plurality of servers, as would be consistent with remote server 104. As shown in FIG. 2, computing system 200 includes a network interface component (NIC) 202 configured for communication with a network such as network 108 shown in FIG. 1. Consistent with some embodiments, NIC 202 includes a wireless communication component, such as a wireless broadband component, a wireless satellite component, or various other types of wireless communication components including radio frequency (RF), microwave frequency (MWF), and/or infrared (IR) components configured for communication with network 106. Consistent with other embodiments, NIC 202 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 106.

Consistent with some embodiments, computing system 200 includes a system bus 204 for interconnecting various components within computing system 200 and communicating information between the various components. Such components include a processing component 206, which may be one or more processors, micro-controllers, graphics processing units (GPUs) or digital signal processors (DSPs), and a memory component 208, which may correspond to a random access memory (RAM), an internal memory component, a read-only memory (ROM), or an external or static optical, magnetic, or solid-state memory. Consistent with some embodiments, computing system 200 further includes a display component 210 for displaying information to a user of computing system 200. Display component 210 may be a liquid crystal display (LCD) screen, an organic light emitting diode (OLED) screen (including active matrix AMOLED screens), an LED screen, a plasma display, or a cathode ray tube (CRT) display. Computing system 200 may also include an input component 212, allowing for a user of computing system 200, such as consumer 120, to input information to computing system 200. Such information could include payment information such as an amount required to complete a transaction, account information, authentication information such as a credential, or identification information. An input component 212 may include, for example, a keyboard or key pad, whether physical or virtual. Computing system 200 may further include a navigation control component 214, configured to allow a user to navigate along display component 210. Consistent with some embodiments, navigation control component 214 may be a mouse, a trackball, or other such device. Moreover, if device 200 includes a touch screen, display component 210, input component 212, and navigation control 214 may be a single integrated component, such as a capacitive sensor-based touch screen.

Computing system 200 may further include a location component 216 for determining a location of computing system 200. In some embodiments, location component 216 may correspond to a GPS transceiver that is in communication with one or more GPS satellites. In other embodiments, location component 216 may be configured to determine a location of computing system 200 by using an internet protocol (IP) address lookup, or by triangulating a position based on nearby telecommunications towers or wireless access points (WAPs). Location component 216 may be further configured to store a user-defined location in memory component 208 that can be transmitted to a third party for the purpose of identifying a location of computing system 200. Computing system 200 may also include sensor components 218. Sensor components 218 provide sensor functionality, and may correspond to sensors built into consumer computing device 102 or sensor peripherals coupled to consumer computing device 102. Sensor components 218 may include any sensory device that captures information related to consumer 110 and/or consumer computing device 102 that may be associated with any actions that consumer 110 performs using consumer computing device 102. Sensor components 218 may include camera and imaging components, accelerometers, biometric readers, GPS devices, motion capture devices, and other devices that are capable of providing information about consumer computing device 102 or consumer 110, or an environment therearound. Computing system 200 may also include one or more wireless transceivers 220 that may each include an antenna that is separable or integral and is capable of transmitting and receiving information according to one or more wireless network protocols, such as Wi-Fi™, 3G, 4G, HSDPA, LTE, RF, NFC, IEEE 802.11a, b, g, n, ac, or ad, Bluetooth®, BLE, WiMAX, ZigBee®, etc.

Computing system 200 may perform specific operations by processing component 206 executing one or more sequences of instructions contained memory component 208. In other embodiments, hard-wired circuitry may be used in place of or in combination with software instructions to implement the present disclosure. Logic may be encoded in a computer readable medium, which may refer to any medium that participates in providing instructions to processing component 206 for execution, including memory component 208. Consistent with some embodiments, the computer readable medium is tangible and non-transitory. In various implementations, non-volatile media include optical or magnetic disks, volatile media includes dynamic memory, and transmission media includes coaxial cables, copper wire, and fiber optics, including wires that comprise system bus 204. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computing system 200. In various other embodiments of the present disclosure, a plurality of computing systems 200 coupled by a communication link 222 to network 108 (e.g., such as a LAN, WLAN, PTSN, and/or various other wired or wireless networks, including telecommunications, mobile, and cellular phone networks) may perform instruction sequences to practice the present disclosure in coordination with one another. Computing system 200 may transmit and receive messages, data and one or more data packets, information and instructions, including one or more programs (i.e., application code) through communication link 222 and network interface component 202 and wireless transceiver 220. Received program code may be executed by processing component 206 as received and/or stored in memory component 208.

Figure 3:
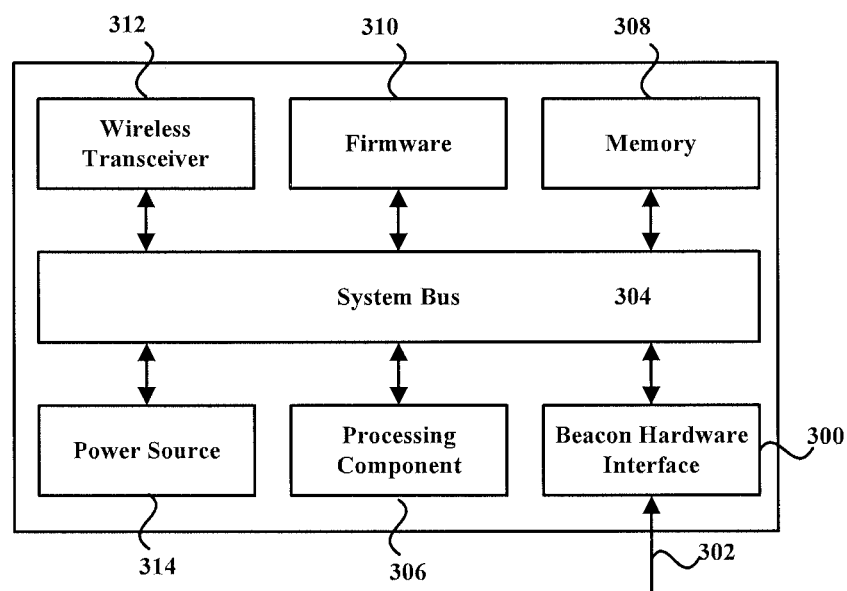
FIG. 3 is a diagram illustrating a beacon, consistent with some embodiments.

FIG. 3 is a diagram illustrating a beacon 108, consistent with some embodiments. As shown in FIG. 3, beacon 108 includes a beacon hardware interface 300 having a device coupling link 302 that allows for direct data writing to beacon 108 to provide updates and other instructions. Beacon 108 also includes a system bus 304 for interconnecting various components within beacon 108 and communicating information between the various components. Such components include a processing component 306, which may be one or more processors, micro-controllers, graphics processing units (GPUs) or digital signal processors (DSPs), a memory component 208, firmware 310 and one or more wireless transceivers 312 that may each include an antenna that is separable or integral and is capable of transmitting and receiving information according to one or more wireless network protocols, such as Wi-Fi™, 3G, 4G, HSDPA, LTE, RF, NFC, IEEE 802.11a, b, g, n, ac, or ad, Bluetooth®, BLE, WiMAX, ZigBee®, etc. Beacon 108 may also include a power source 314. Power source 314 may be any power source capable of providing sufficient current to power the components of beacon 108. In some embodiments, power source 318 may be a battery, such as a watch battery or button cell.

In some embodiments, beacon 108 may be configured to transmit information using wireless transceivers 312 based on instructions stored in memory 308 and/or firmware 310 executed by processing component 306. The instructions may be stored in memory 308 and/or firmware 310 by directly writing the instructions to memory 308 and/or firmware 310 over communication link 302 to beacon hardware interface 300 or by wirelessly receiving instructions by wireless transceivers 312. In some embodiments, beacon 108 may be configured to transmit information related to forms of payment that are accepted by a merchant associated with beacon 108. In some embodiments, beacon 108 may also transmit instructions that when received by consumer computing device 102 may cause forms of payment display application 114 to be executed by processing component 206 to cause accepted forms of payment to be displayed by display component 210 of consumer computing device 102. Further, beacon 108 may transfer instructions that, when received by consumer computing device 102 cause payment application 116 to be executed by processing component to allow consumer 110 to authorize a payment to be processed by remote server 104. In some embodiments, wireless transceiver 312 may correspond to a BLE transceiver configured to transmit and receive information according to the BLE protocol.

Figure 4:
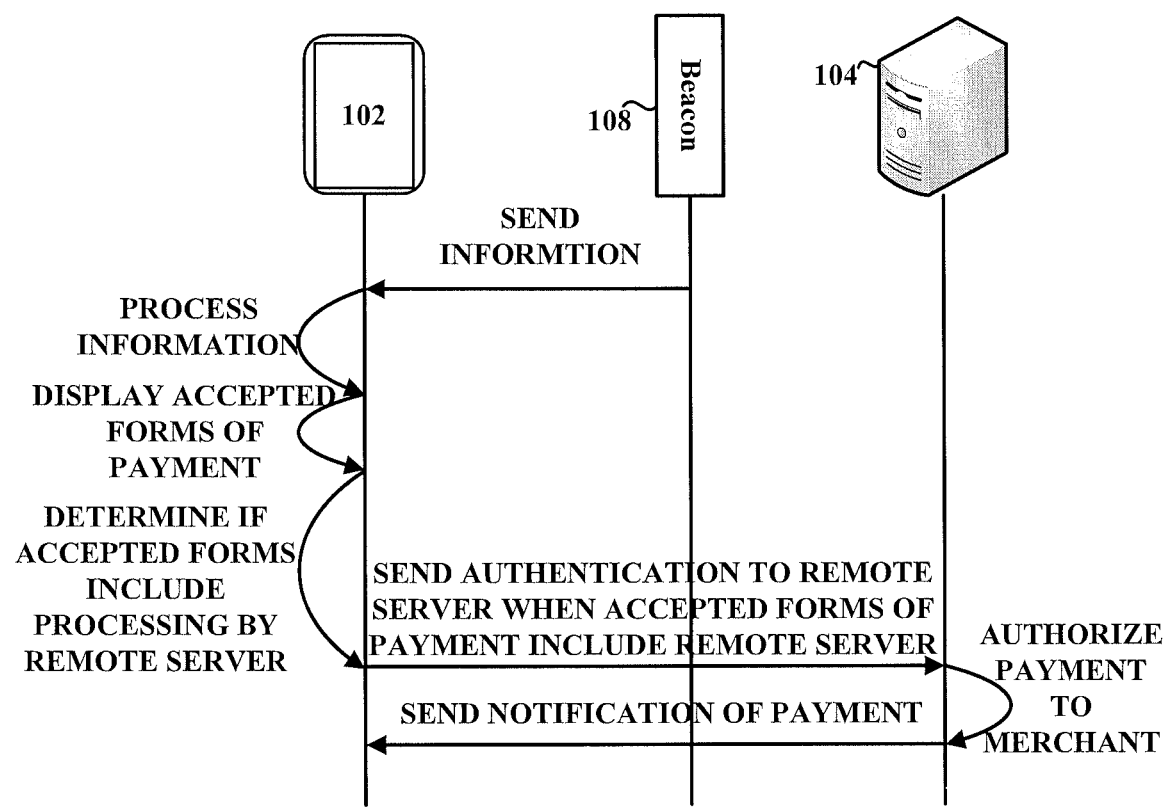
FIG. 4 is a diagram illustrating a flow of determining accepted forms of payment from wirelessly-received information, consistent with some embodiments.

FIG. 4 is a diagram illustrating a flow of determining accepted forms of payment from wirelessly-received information, consistent with some embodiments. As shown in FIG. 4, beacon 108 may periodically transmit information related to forms of payment accepted at a merchant in which beacon 108 is located or associated with such that any device capable of receiving the information sent by beacon 108 may be able to receive the transmitted information related to accepted forms of payment. In some embodiments, beacon 108 may be a BLE beacon, and may send out the information using the BLE protocol. When consumer 110 having consumer computing device 102 comes within range of beacon 108, for example by entering a merchant location, consumer computing device 102 may receive the information sent by beacon 108. Processing component 206 may process the received information to determine the accepted forms of payment and forms of payment display application 114 may display the accepted forms of payment to consumer 110 on display component 210 of consumer computing device 102.

In some embodiments, processing component 206 of consumer computing device 102 may also determine if the accepted forms of payment include payment processing by remote server 104. For example, remote server 104 may be a payment service processing server or provider, such as may be provided by PayPal, Inc. of San Jose, Calif., and the accepted forms of payment may include PayPal. When processing component 206 of consumer computing device 102 determines that the accepted forms of payment include payments processed by remote server 104, processing component 206 may activate payment application 112 which may initiate an authentication to remote server 104. Consumer 110 may then be able to authorize a payment to the merchant using remote server 104 and, upon authentication, remote server 104 may authorize the payment and send a notification of the payment to consumer computing device 102 for viewing by consumer 110. Embodiments consistent with FIG. 4 may allow a consumer to determine forms of payment accepted by a merchant by entering into the merchant location and coming into range of a beacon that is transmitting information related to the accepted forms of payment. Similarly, the merchant may be able to notify consumers of the forms of payment they accept by installing a beacon and programming the beacon to periodically transmit this information to consumers. Moreover, if the beacon is a BLE beacon, the merchant is able to provide consumers with this information using a low cost transmitter that may have a long battery life.

Figure 5:
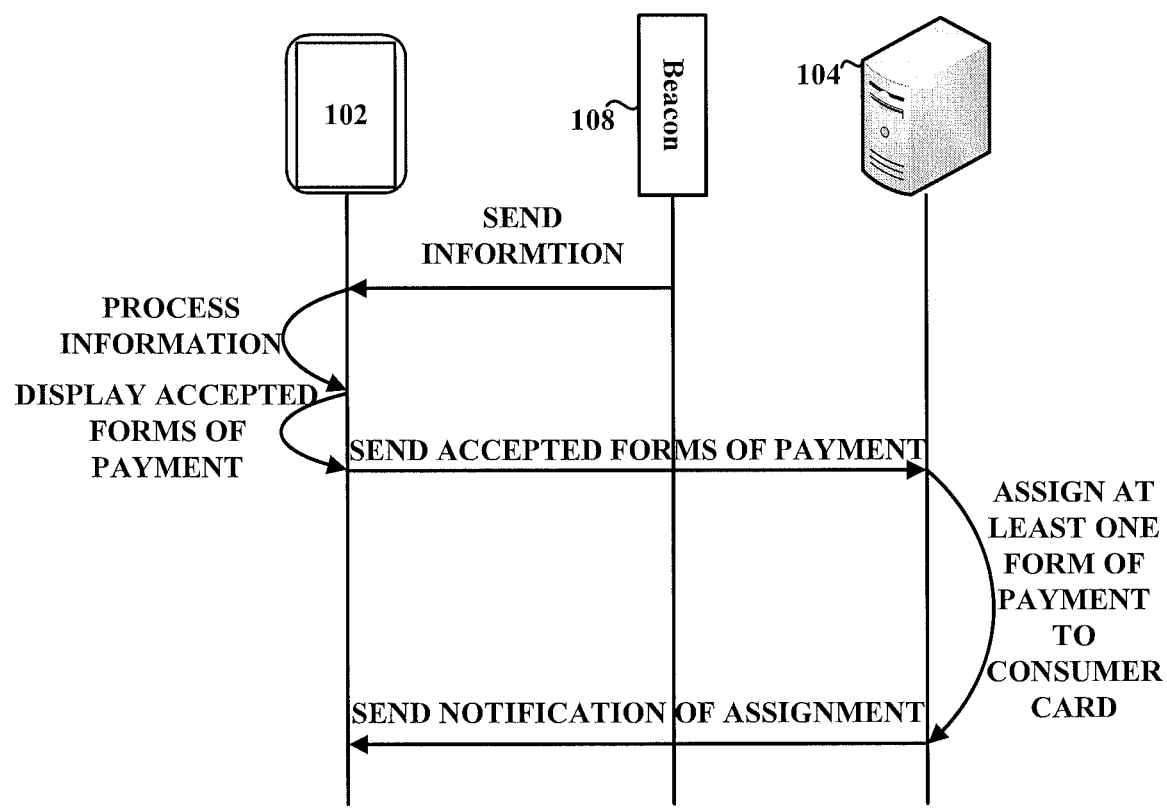
FIG. 5 is a diagram illustrating a flow of assigning at least one accepted form of payment to a programmable spending card, consistent with some embodiments.

FIG. 5 is a diagram illustrating a flow of assigning at least one accepted form of payment to a programmable spending card, consistent with some embodiments. As shown in FIG. 5, beacon 108 may periodically transmit information related to forms of payment accepted at a merchant in which beacon 108 is located or associated with such that any device capable of receiving the information sent by beacon 108 may be able to receive the transmitted information related to accepted forms of payment. In some embodiments, beacon 108 may be a BLE beacon, and may send out the information using the BLE protocol. When consumer 110 having consumer computing device 102 comes within range of beacon 108, for example by entering a merchant location, consumer computing device 102 may receive the information sent by beacon 108. Processing component 206 may process the received information to determine the accepted forms of payment and forms of payment display application 114 may display the accepted forms of payment to consumer 110 on display component 210 of consumer computing device 102.

Network interface component 202 of consumer computing device 102 may then send the accepted forms of payment to remote server 104. In some embodiments, consumer 110 may be required to authenticate to remote server 104 in order to send the accepted forms of payment. Such authentication may be initiated by payment application 116 and/or other applications 118. Moreover, in some embodiments, the sending of accepted forms of payment, including any required authentication, may be automatically performed by consumer computing device 102 after receiving the information related to the accepted forms of payment from beacon 108. When remote server 104 receives the accepted forms of payment from consumer computing device 102, remote server 104 may assign one or more of the accepted forms of payment to a programmable spending card associated with consumer 110, issued by remote server 104, and tied to an account on remote server 104 of consumer 110.

In some embodiments, the programmable spending card may be programmable to have any reserved card number that, when processed, may be associated with a consumer 110 account on remote server 104. In some embodiments, the programmable spending card may have a particular 10 digit number associated with an account of consumer 110, wherein the number can be prepended based on the particular forms of payment accepted by the merchant and appended with extra digits to meet the required number of digits for a particular form of payment. Different credit card companies may have different Issuer Identification Numbers (IINs) that uniquely identify a credit card with a specific credit card issuer and have different lengths. For example, Visa® may have an TIN that includes a 4 as a leading number and a number length of 13 or 16 digits, while MasterCard® may have an TIN that includes leading digits that are between 51-55 and a number length of 16 digits and American Express may have an TIN that includes leading digits that are either 34 or 37 and a number length of 15 digits. Consequently, when programming the programmable spending card, remote server 104 may program the card to have an IIN that corresponds to at least one of the accepted forms of payment so that consumer 110 can use the spending card at the merchant. In some embodiments, consumer 110 may not have a physical programmable spending card, but instead may have a virtual programmable card that may include just numbers that consumer 110 can enter or present to merchant to authorize a payment. Moreover, payment application 116 may be configured to receive an assigned card number from remote server 104 and generate a bar code or Quick Response (QR) code for display by display component 210 of consumer computing device 102 and scanning by merchant.

Consequently, embodiments consistent with FIG. 5 may allow a consumer to be assigned with a programmable credit card that can be programmed based on the forms of payment accepted by a merchant as informed to the consumer through a beacon and provided to the issuer of the programmable credit card from the consumer computing device 102.

Figure 6:
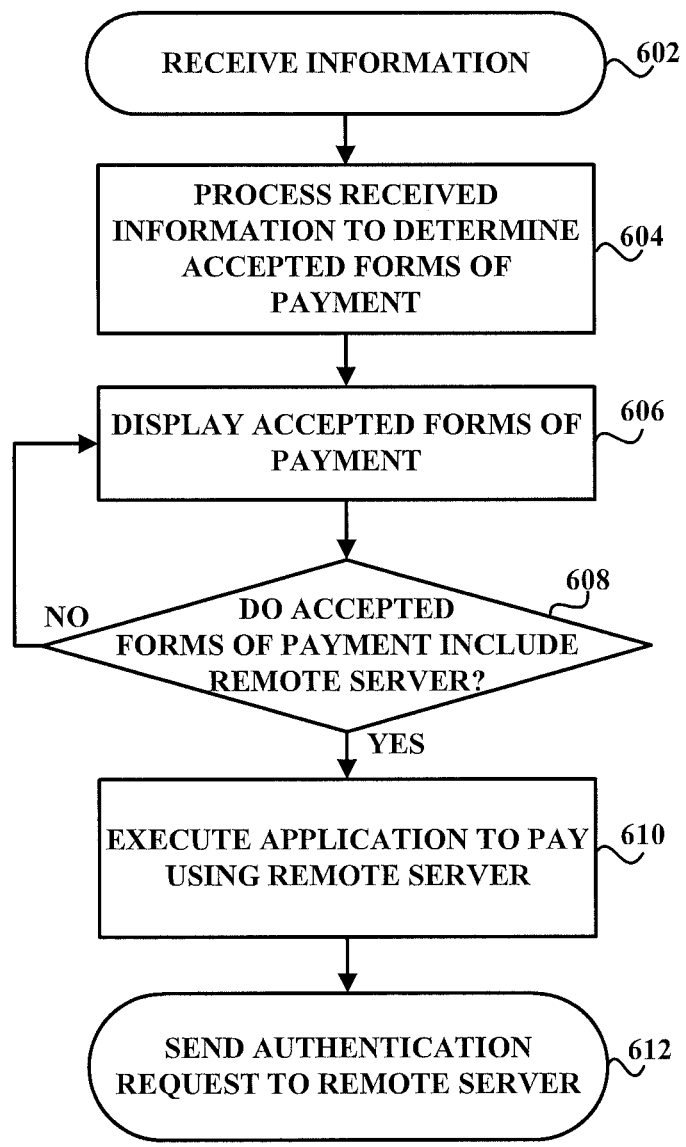
FIG. 6 is a flowchart illustrating a method for determining accepted forms of payment from wirelessly-received information, consistent with some embodiments.

FIG. 6 is a flowchart illustrating a method for determining accepted forms of payment from wirelessly-received information, consistent with some embodiments. For the purpose of illustration, FIG. 6 may be described with reference to any of FIGS. 1-4. The method shown in FIG. 6 may be embodied in computer-readable instructions for execution by one or more processors such that the steps of the method may be performed by consumer computing device 102. As shown in FIG. 6, consumer computing device 102 may wirelessly receive information related to accepted forms of payment (602). In some embodiments, the wirelessly sent information may be sent by beacon 108 that may be installed in or near a merchant location such that when consumer computing device 102 comes within range of beacon 108, consumer computing device 102 may receive the transmitted information. Consumer computing device 102 may then process the received information to determine the forms of payment accepted by the merchant (604). In some embodiments, processing component 206 may process the received information based on instructions stored in memory 208. Consumer computing device 102 may then display the accepted forms of payment on display component 210 (606). In some embodiments, accepted forms of payment display application 114 may be executed by processing component 206 to cause display component 210 to display the accepted forms of payment on consumer computing device 102 to consumer 110.

Processing component 206 may also determine if the accepted forms of payment include payments processed by remote server 104 (608). When the accepted forms of payment do not include payments processed by remote server 104, consumer computing device 102 may just continue to display the accepted forms of payment to consumer 110 (606). When the accepted forms of payment include payments processed by remote server 104, processing component 206 may execute payment application 116 to pay for items purchased at the merchant location using payments processed by remote server 104 (610). Payment application 116 may then send an authentication request to remote server 104 (612) for authenticating consumer computing device 102 and consumer 110 to remote server 104. Once consumer 110 has authenticated to remote server 104, consumer 110 may be able to enter in information such as an item, item number, quantity, price, and the like, or have them entered automatically by scanning a bar code using a scanning application such as RedLaser™. This information may also be sent to remote server 104 by payment application 116 of client computing device 102. Consumer 110 may then be able to authorize a payment to be made by remote server 104 to the merchant for the item.

Figure 7:
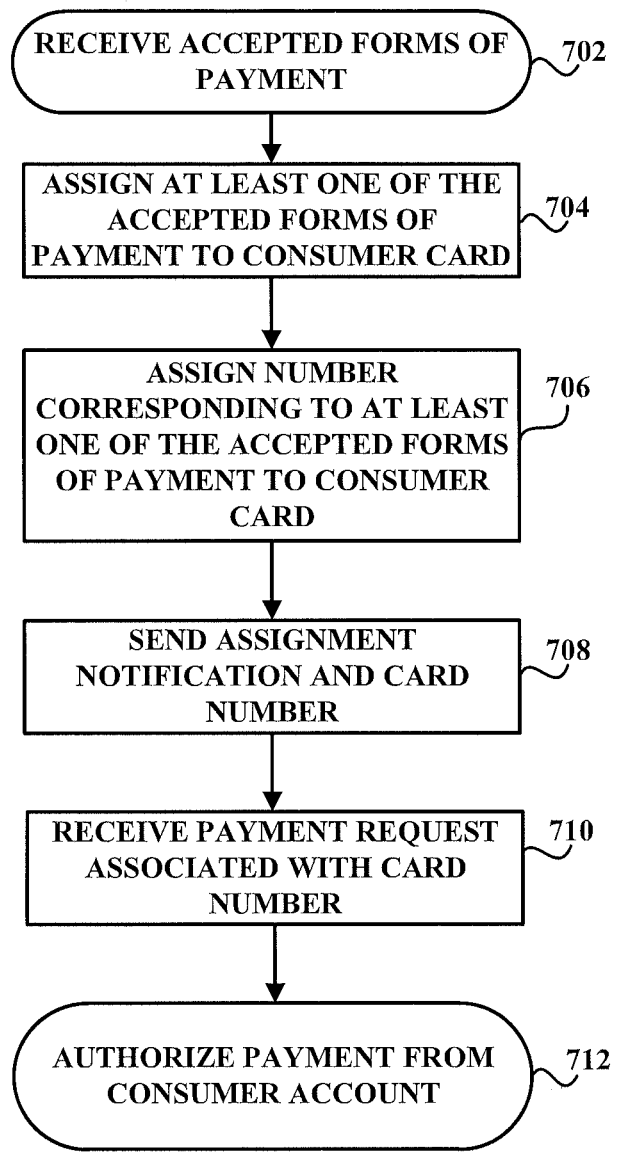
FIG. 7 is a flowchart illustrating assigning at least one accepted form of payment to a programmable spending card, consistent with some embodiments.

FIG. 7 is a flowchart illustrating assigning at least one accepted form of payment to a programmable spending card, consistent with some embodiments. For the purpose of illustration, FIG. 7 may be described with reference to any of FIGS. 1-3 and 5. The method shown in FIG. 7 may be embodied in computer-readable instructions for execution by one or more processors such that the steps of the method may be performed by remote server 104. As shown in FIG. 7, remote server 104 may receive one or more accepted forms of payment (702). In some embodiments, the one or more accepted forms of payment may be received from consumer computing device 102 based on information wirelessly transmitted to consumer computing device 102 by a beacon 108 associated with a merchant. Based on the received accepted forms of payment, remote server 104 may assign at least one of the accepted forms of payment to a programmable spending card associated with consumer 110 (704).

Based on the at least one accepted form of payment assigned to the programmable spending card, remote server 104 may then assign a card number corresponding to the at least one of the accepted forms of payment (706). In some embodiments, the programmable spending card may be programmable to have any reserved card number that, when processed, may be associated with a consumer 110 account on remote server 104. In some embodiments, the programmable spending card may have a particular number associated with an account of consumer 110, wherein the number can be prepended and appended based on the assigned form of payment. Remote server 104 may then send the assigned form of payment along with an associated card number (708). In some embodiments, the programmable card may have a network interface component and may be configured to receive the send card number. In some embodiments, consumer 110 may not have a physical programmable spending card, but instead may have a virtual programmable card that may include just numbers that consumer 110 can enter or present to merchant to authorize a payment. Moreover, payment application 116 may be configured to receive an assigned card number from remote server 104 and generate a bar code or Quick Response (QR) code for display by display component 210 of consumer computing device 102 and scanning by merchant.

After consumer 110 has used the assigned form of payment with the assigned card number for payment, remote server 104 may receive a payment request associated with the card number (710). Processing component 206 may execute instructions stored in memory 208 for initiating payment application 120 which may match the received card number and the payment request to an account associated with consumer 110 and stored in account information 124 of account database 122. Remote server 104 may then authorize the payment from the consumer account (712).

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Embodiments described herein may allow a consumer to determine forms of payment accepted by a merchant by entering into the merchant location and coming into range of a beacon that is wirelessly transmitting information related to the accepted forms of payment. Embodiments described herein may also allow merchant to notify consumers of the forms of payment they accept by installing a beacon and programming the beacon to periodically transmit this information to consumers. Embodiments described herein may further allow a consumer to be assigned a programmable credit card that can be programmed based on the forms of payment accepted by a merchant as informed to the consumer through a beacon and provided to the issuer of the programmable credit card. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A system comprising:
one or more computer-readable memories storing program instructions; and
one or more processors configured to execute the program instructions to cause the system to perform operations comprising:
identifying one or more forms of payment accepted by a merchant based on information received from a beacon device associated with the merchant; and
in response to the identifying the one or more forms of payment:
causing a payment provider server to associate a payment identifier with a user account, the payment identifier corresponding to a selected form of payment of the one or more forms of payment, and
causing the payment provider server to utilize the payment identifier to program a payment instrument.

2. The system of claim 1, wherein the payment instrument is a virtual payment instrument.

3. The system of claim 2, the operations further comprising in response to the causing the payment provider server to utilize the payment identifier to program the payment instrument, displaying a scannable quick response (QR) code associated with the selected form of payment.

4. The system of claim 1, wherein the payment instrument is a physical payment card.

5. The system of claim 1, wherein the causing the payment provider server to utilize the payment identifier to program the payment instrument includes altering a first identifier associated with the payment instrument based on characteristics associated with the selected form of payment.

6. The system of claim 5, wherein the first identifier is associated with a first credit issuer, and the altered identifier is associated with a second credit issuer.

7. The system of claim 1, wherein the payment identifier is a card number.

8. A method comprising:
identifying one or more forms of payment accepted by a merchant based on information received from a beacon device associated with the merchant; and
in response to the identifying the one or more forms of payment:
causing a payment provider server to associate a payment identifier with a user account, the payment identifier corresponding to a selected form of payment of the one or more forms of payment, and
causing the payment provider server to utilize the payment identifier to program a payment instrument.

9. The method of claim 8, wherein the payment instrument is a virtual payment instrument.

10. The method of claim 9, further comprising:
in response to the causing the payment provider to utilize the payment identifier to program the payment instrument, displaying a scannable quick response (QR) code associated with the selected form of payment.

11. The method of claim 8, wherein the payment instrument is a physical payment card.

12. The method of claim 9, wherein the causing the payment provider server to utilize the payment identifier to program the payment instrument includes altering a first identifier associated with the payment instrument based on characteristics associated with the selected form of payment.

13. The method of claim 12, wherein the first identifier is associated with a first credit issuer, and the altered identifier is associated with a second credit issuer.

14. The method of claim 8, wherein the payment identifier is a card number.

15. A non-transitory computer readable medium storing program instructions, the program instructions when executed cause a machine to perform operations comprising:
identifying one or more forms of payment accepted by a merchant based on information received from a beacon device associated with the merchant; and
in response to the identifying the one or more forms of payment:
causing a payment provider server to associate a payment identifier with a user account, the payment identifier corresponding to a selected form of payment of the one or more forms of payment, and
causing the payment provider server to utilize the payment identifier to program a payment instrument.

16. The non-transitory computer readable medium of claim 15, wherein the payment instrument is a virtual payment instrument.

17. The non-transitory computer readable medium of claim 16, the operations further comprising in response to the causing the payment provider to utilize the payment identifier to program the payment instrument, displaying a scannable quick response (QR) code associated with the selected form of payment.

18. The non-transitory computer readable medium of claim 15, wherein the payment instrument is a physical payment card.

19. The non-transitory computer readable medium of claim 15, wherein the causing the payment provider server to utilize the payment identifier to program the payment instrument includes altering a first identifier associated with the payment instrument based on characteristics associated with the selected form of payment.

20. The non-transitory computer readable medium of claim 19, wherein the first identifier is associated with a first credit issuer, and the altered identifier is associated with a second credit issuer.

\* \* \* \* \*